(12) United States Patent
Cardoso de Moura et al.

(10) Patent No.: US 10,045,161 B2
(45) Date of Patent: Aug. 7, 2018

(54) SYSTEMS AND METHODS FOR VEHICULAR POSITIONING BASED ON THE ROUND-TRIP TIME OF DSRC MESSAGES IN A NETWORK OF MOVING THINGS

(71) Applicant: Veniam, Inc., Mountain View, CA (US)

(72) Inventors: Daniel Cardoso de Moura, Vila Nova de Gaia (PT); Nuno Alexandre Tavares Coutinho, Oporto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/596,380

(22) Filed: May 16, 2017

(65) Prior Publication Data
US 2017/0332208 A1    Nov. 16, 2017

Related U.S. Application Data

(60) Provisional application No. 62/336,891, filed on May 16, 2016.

(51) Int. Cl.
| | | |
|---|---|---|
| *H04W 24/00* | (2009.01) | |
| *H04W 4/04* | (2009.01) | |
| *H04W 4/06* | (2009.01) | |
| *H04W 24/08* | (2009.01) | |
| *G01C 21/00* | (2006.01) | |
| *G01C 21/28* | (2006.01) | |
| *H04M 11/04* | (2006.01) | |
| *H04W 84/00* | (2009.01) | |

(52) U.S. Cl.
CPC .......... *H04W 4/046* (2013.01); *G01C 21/005* (2013.01); *G01C 21/28* (2013.01); *H04W 4/06* (2013.01); *H04W 24/08* (2013.01); *H04W 84/005* (2013.01)

(58) Field of Classification Search
CPC ....... H04W 4/02; H04W 4/021; H04W 4/022; H04W 4/023; H04W 4/025; H04W 4/04; H04W 4/043; H04W 4/046
USPC ...................................................... 455/456.1
See application file for complete search history.

(56) References Cited

U.S. PATENT DOCUMENTS

| | | | |
|---|---|---|---|
| 9,253,599 B1 * | 2/2016 | Venkatraman ........ | H04W 4/023 |
| 9,521,645 B1 * | 12/2016 | Zhao ..................... | H04W 64/00 |
| 2013/0172005 A1 * | 7/2013 | Finlow-Bates ..... | H04W 64/003 |
| | | | 455/456.1 |

OTHER PUBLICATIONS

Dr. Michelle Weigel, "Standards: WAVE / DSRC / 802.11p", http://www.cvt-project.ir/Admin/Files/eventAttachments/109.pdf, retrieved Apr. 5, 2016.

(Continued)

*Primary Examiner* — Huy C Ho
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). More specifically, systems and methods for vehicular positioning based on the round-trip time of DSRC messages in a network of moving things.

21 Claims, 16 Drawing Sheets

(56) References Cited

OTHER PUBLICATIONS

P. Fuxjager, et al., http://thomaszemen.org/papers/Fuxjaeger10-WSR-paper.pdf retrieved on Apr. 11, 2016.

N. Lyamin, et al., http://www2.hh.se/staff/magnusj/papers/2014_IEEECommLett_DoS.pdf retrieved on Apr. 11, 2016.

L. Miao, et al., 'A Survey of IEEE 802.11p MAC Protocol', http://www.cyberjournals.com/Papers/Sep2011/04.pdf retrieved on Apr. 11, 2016.

R. Faragher, "Understanding the Basis of the Kalman Filter . . .",https://www.cl.cam.ac.uk/~rmf25/papers/Understanding%20the%20Basis%20of%20the%20Kalman%20Filter.pdf retrieved on May 11, 2016.

* cited by examiner

SYSTEMS AND METHODS FOR VEHICULAR POSITIONING BASED ON THE ROUND-TRIP TIME OF DSRC MESSAGES IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/336,891, filed on May 16, 2016, and titled "Systems and Methods for Vehicular Positioning Based on the Round-Trip Time of DSRC Messages in a Network of Moving Things," which is hereby incorporated herein by reference, in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
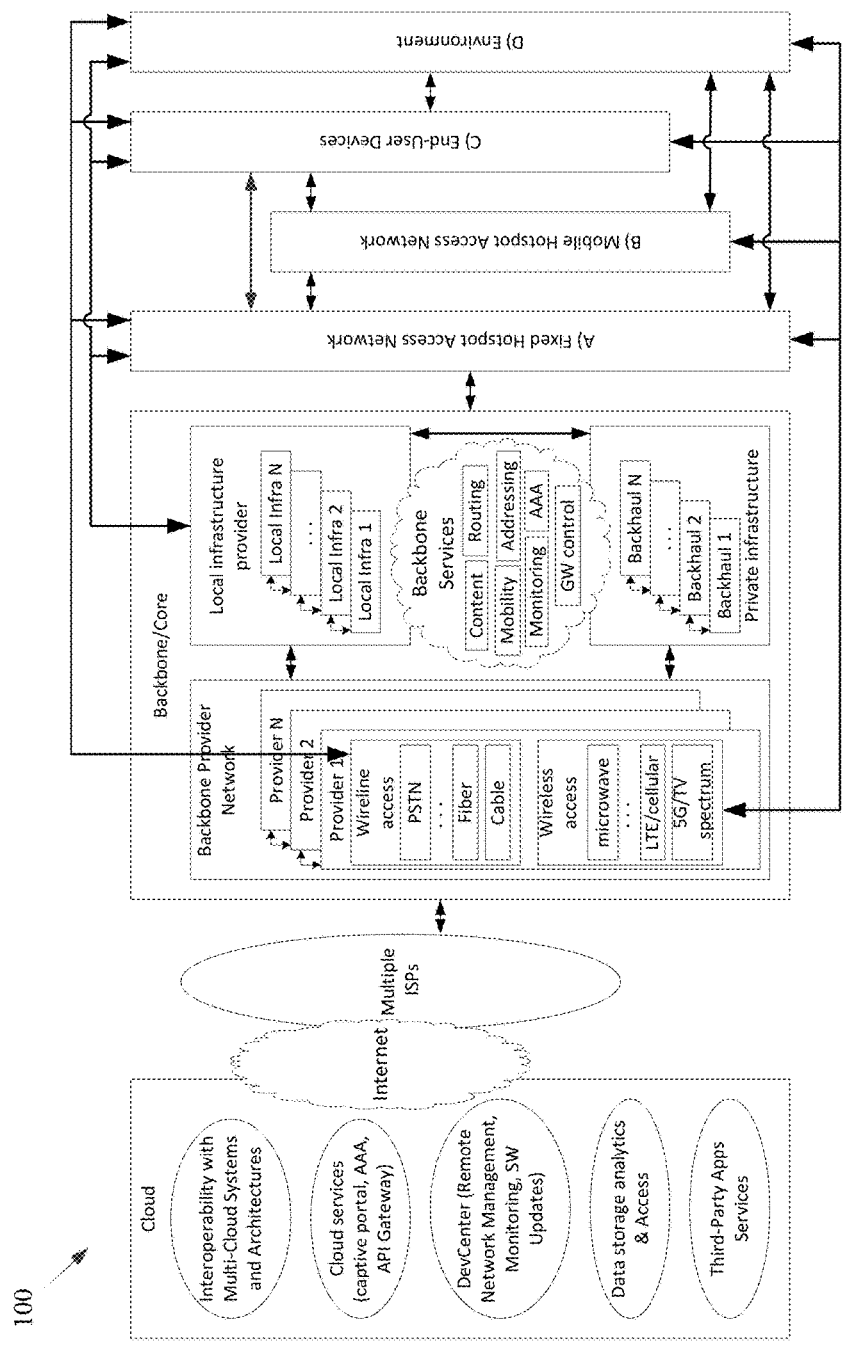
FIG. 1 shows a block diagram of a communication network 100, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and CO2 emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
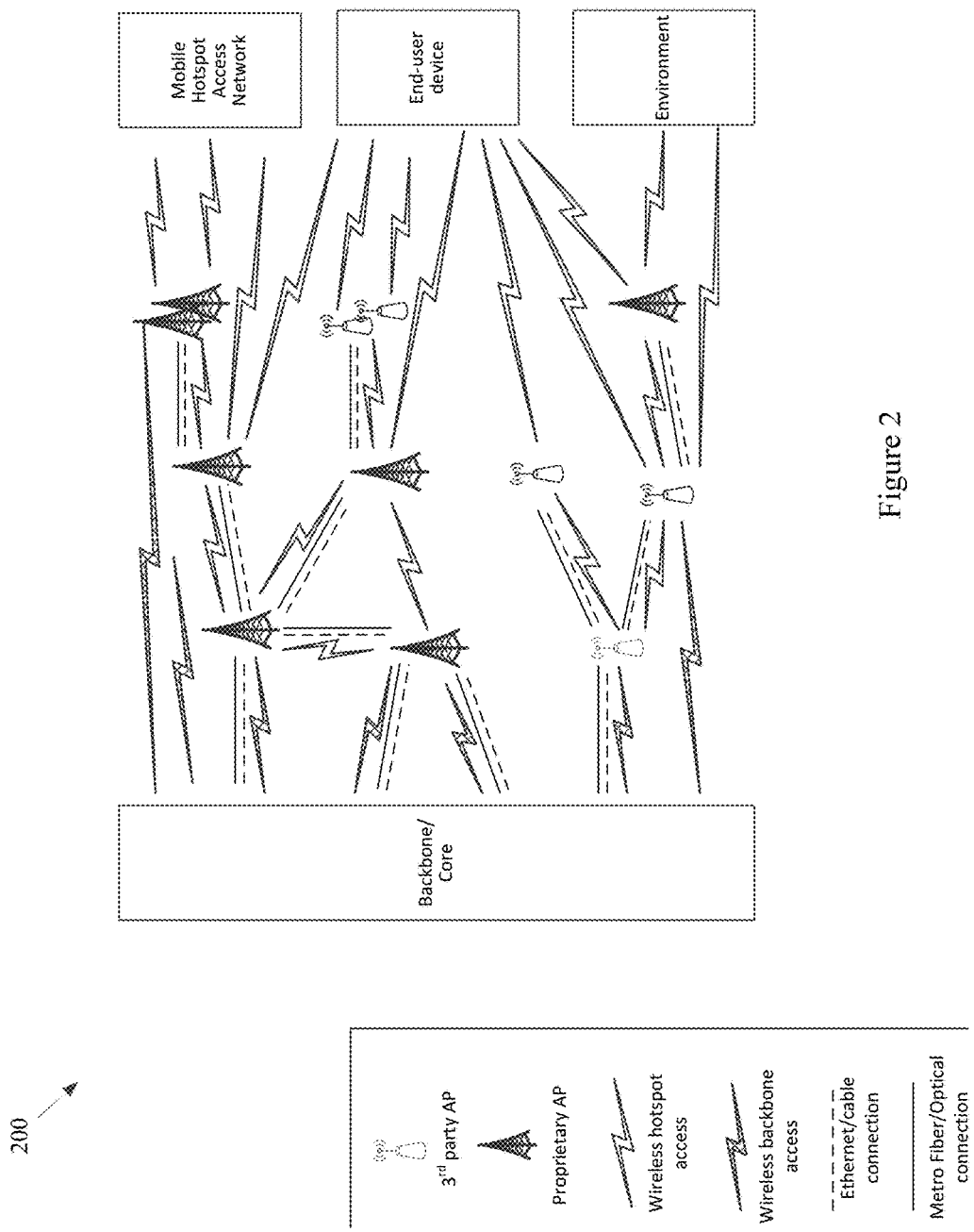
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
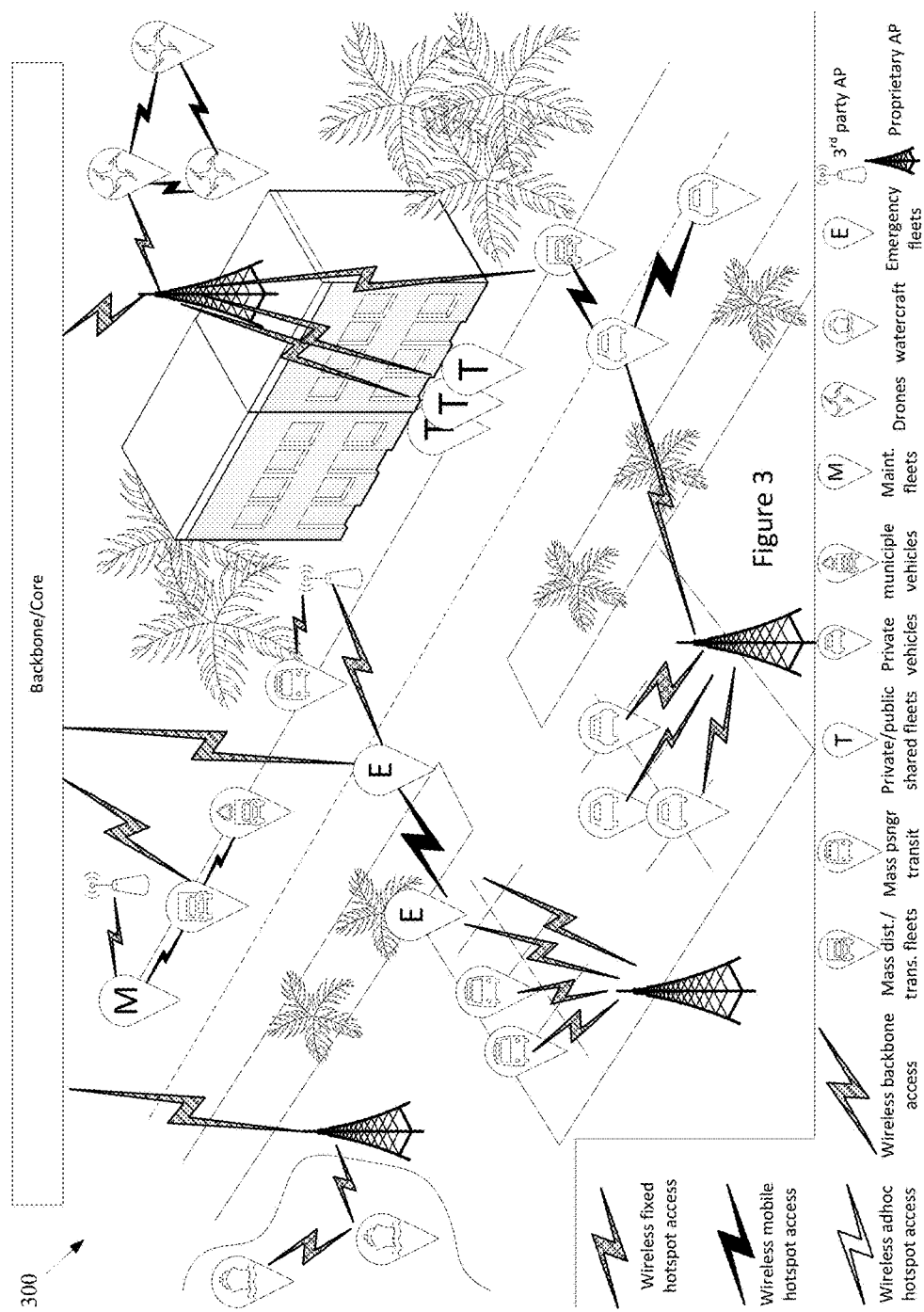
FIG. 3 shows a diagram of a Mobile Hotspot Access Network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
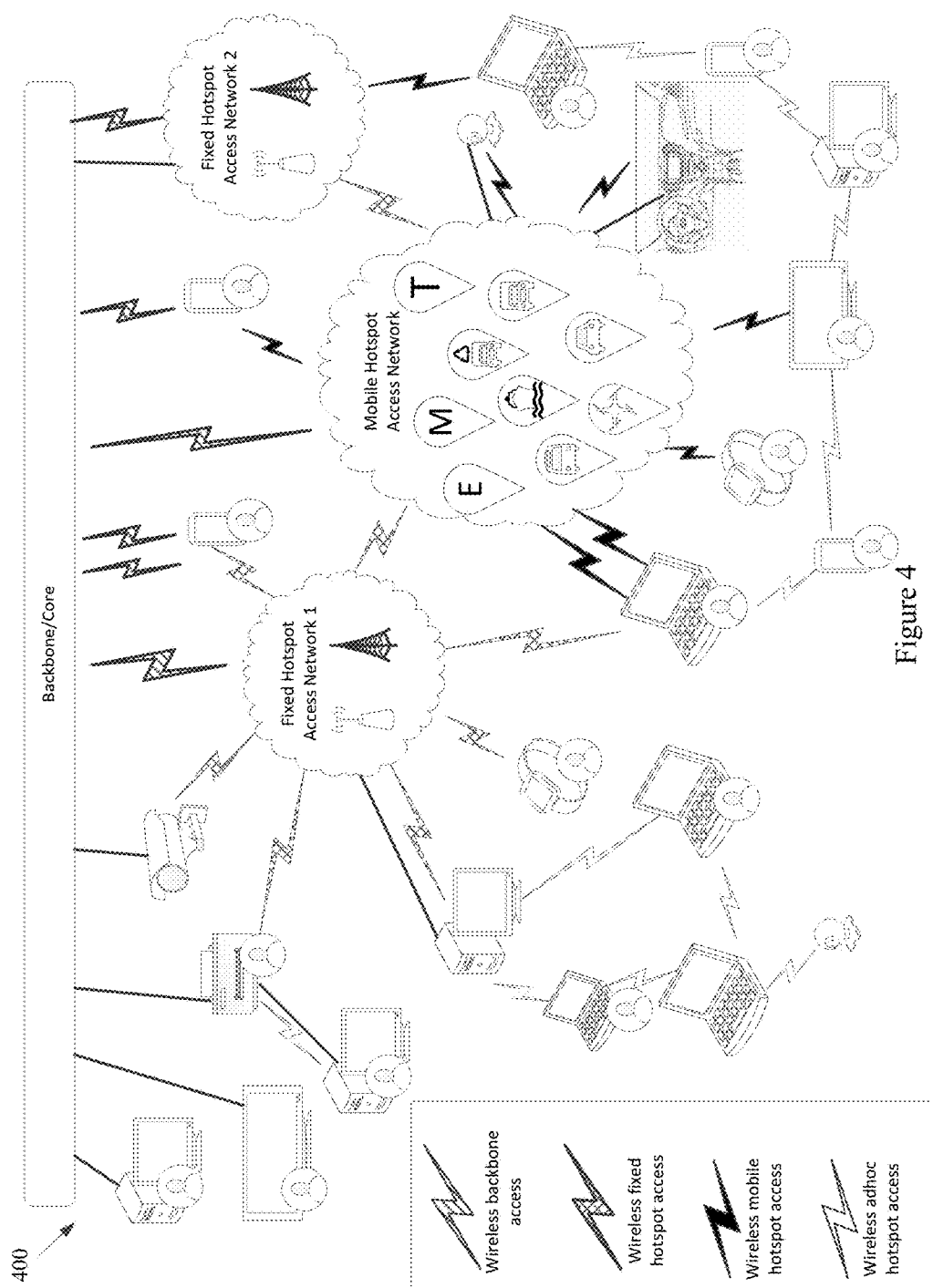
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
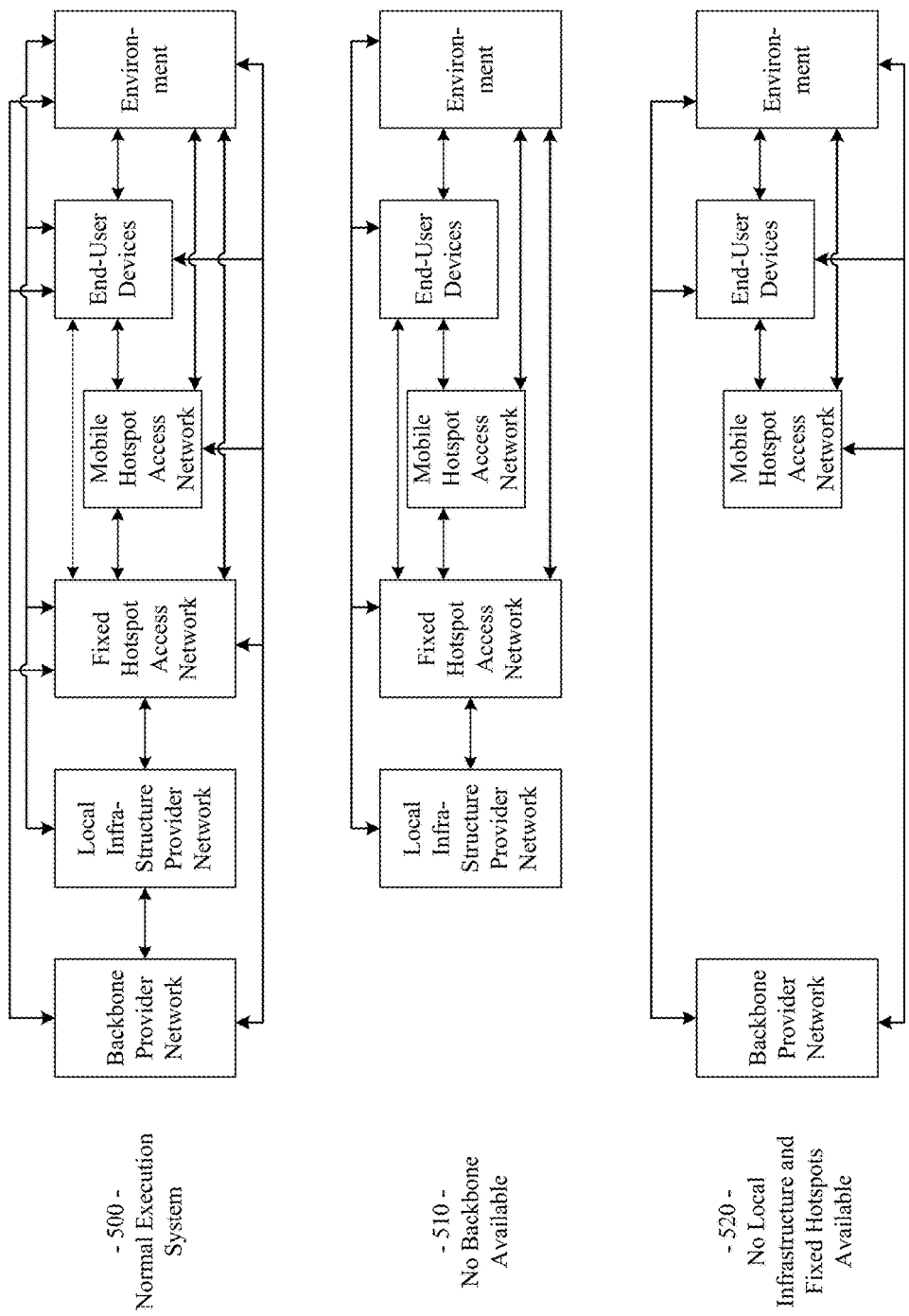
FIGS. 5A-5C show a plurality of network configurations illustrating the flexibility and/or resiliency of a communication network, in accordance with various aspects of this disclosure.
Figure 5B:
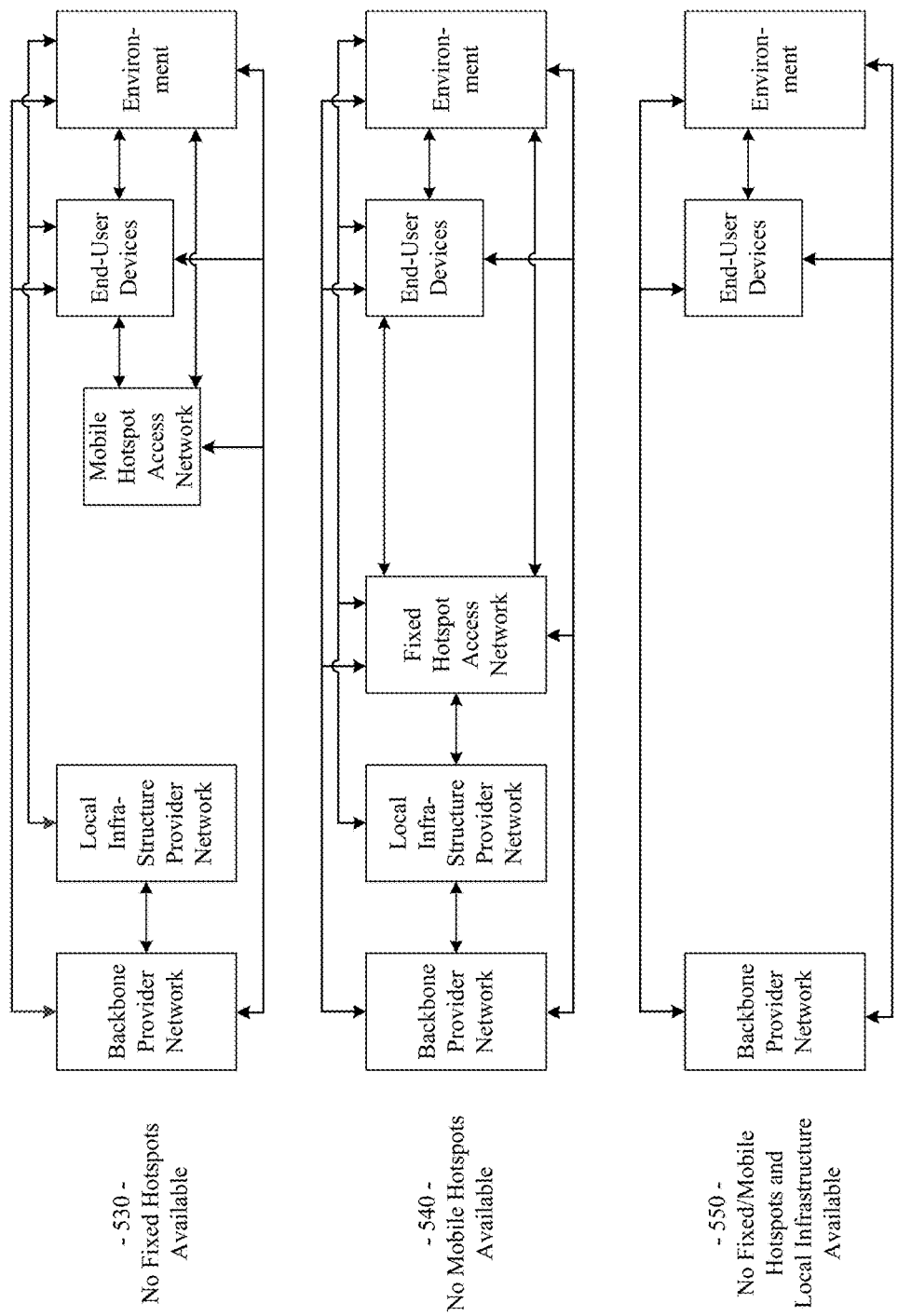
Figure 5C:
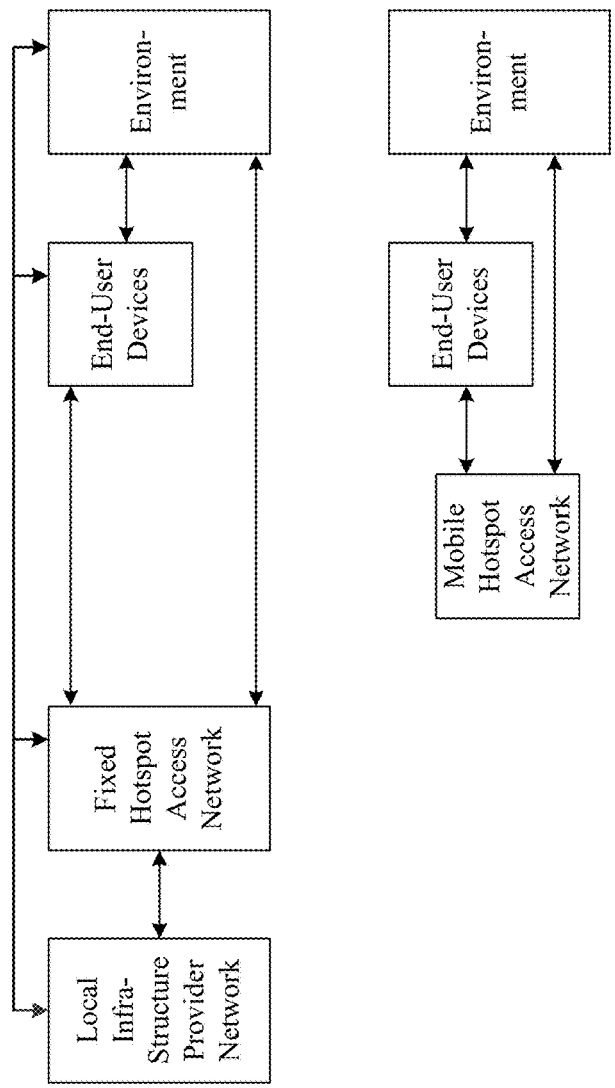

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
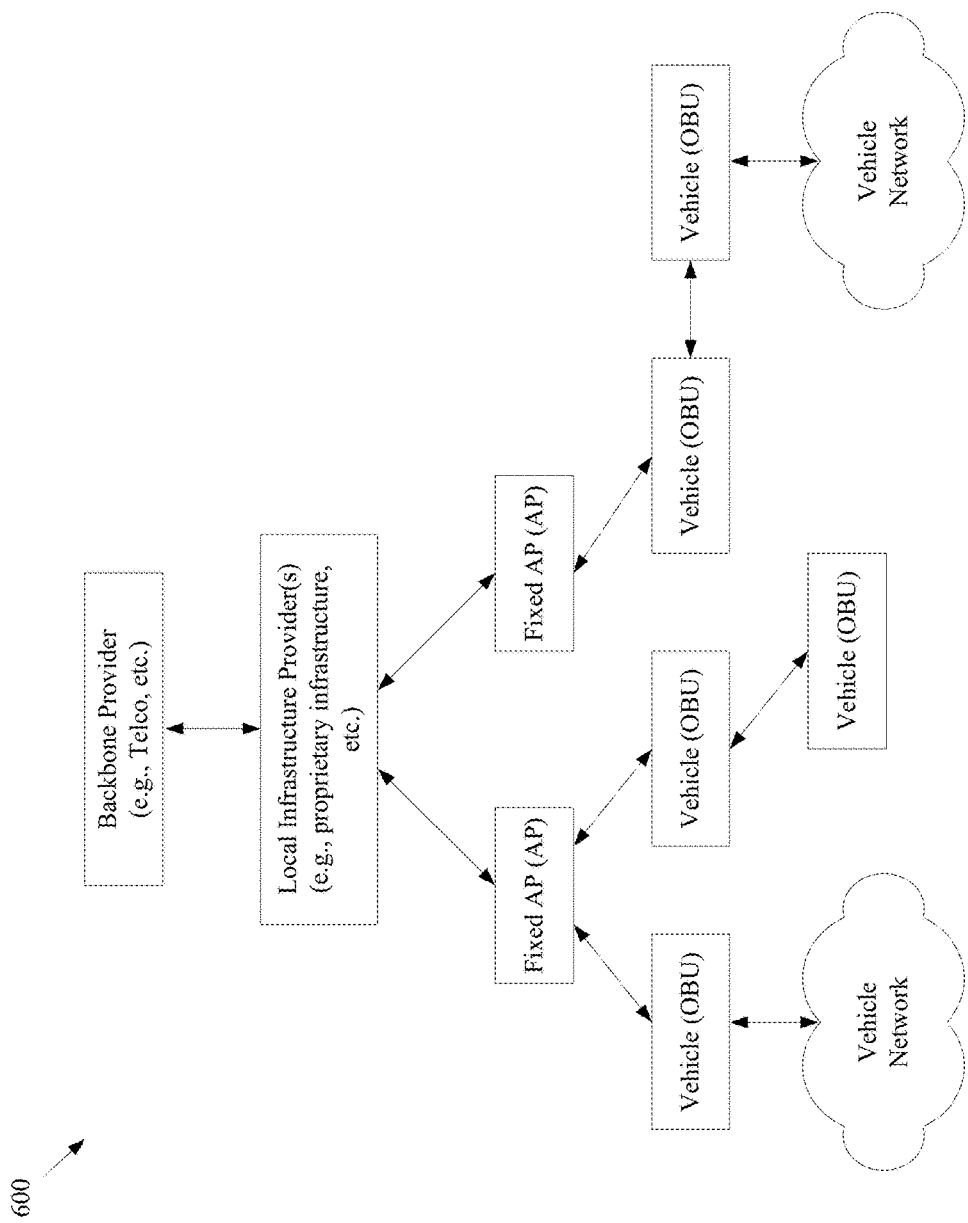
FIG. 6 shows yet another block diagram of an example network configuration, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In a network of moving things, it is highly useful for mobile network elements such as the Mobile APs discussed above to accurately know their geographic location. As described above, the availability of accurate geographic position information enables a myriad of software applications. Those technologies that provide the greatest accuracy, such as Global Navigation Satellite Systems (GNSS) including, for example, GPS, GLONASS, and others, exhibit large positioning errors in urban environments due to the presence of tall buildings that occlude line-of-sight reception of signals from satellites, resulting in poor satellite geometry and, therefore, high geometric dilution of precision (DOP).

In addition, occlusion of direct reception of satellite signals also makes an available Satellite-Based Augmentation Systems (SBAS) useless most of the time, because receivers for SBAS signals typically, do not have reliable line-of-sight (LOS) access to the geostationary satellites that transmit GNSS correction information. In tunnels GNSS receivers are useless, since there is no LOS access to any satellite. In addition, multi-path effects are very common in urban scenarios due to reflection of the satellite signal by buildings and many other objects that are present in those environments. Even further, weather conditions (e.g. clouds and precipitation) also negatively affect GNSS receiver performance. For at least these reasons, there are advantages to be gained through the use of alternative positioning solutions that do not rely on satellites.

A network of moving things in accordance with various aspects of the present disclosure uses multiple wireless communication interfaces, including the Dedicated Short-Range Communication (DSRC) technology that is the preferred wireless communication interface for vehicle-to-vehicle (V2V) communication and for vehicle-to-infrastructure (V2I) communication, and that supports a wireless communication range up to 1 kilometer. The abbreviation DSRC may be used herein to refer to the wireless communication standard also known as the Institute of Electrical and Electronics Engineers (IEEE) 802.11p standard, which is part of IEEE P1556. The propagation time of DSRC messages over the air depends on the distance between the sender and the receiver, with greater distances being associated with higher propagation times. Because the speed of propagation of wireless DSRC signals is close to the speed of light, highly accurate timing with nanosecond precision may be involved when measuring the propagation time of such signals, in order to have accurate estimates of the distance. Keeping the elements of a wireless network synchronized with nanosecond precision is a challenge, making it difficult for such network elements to time message propagation between different network devices with different timekeeping units.

In accordance with various aspects of the present disclosure, network elements are able to measure round-trip time (RTT), the elapsed time between a source network element sending a message to a target network element, and the source network element receiving an acknowledgment of that message from the target network element. Network elements according to various aspects of the present disclosure overcome difficulties of the use of RTT caused by noise in the communication path, and due to multipath that normally result in overestimated distances. By combining distances measured between several network elements, with known (or estimated) geographic positions of some network elements, the 2D position of a given device may be determined.

Mobile network elements (e.g., network elements in vehicles) in a network such as the network of moving things of the present disclosure may, for example, determine the distance from the mobile network element to an access point (AP) (e.g., a MAP or FAP) by sampling the RTT to the AP, applying a statistical model that determines the expected RTT value of the shortest communication path based on multiple samples of the RTT, and then converting that information into a distance estimate. The APs may, for example, be fixed stations with known location coordinates that have been measured using a high accuracy method (e.g., a professional grade differential GPS (DGPS) device), or may be APs residing in other vehicles (e.g., Mobile APs or MAPs) with estimated location coordinates. In accordance with various aspects of the present disclosure, geographic map information may be used to constrain the solutions generated by the process described above. Because vehicles most frequently move on roads, when finding the solution(s) to the problem of geographic position determination, only solutions that lie on roads may be taken into account.

In accordance with various aspects of the present disclosure, the position estimation process at a mobile network element (e.g., an OBU/MAP) may begin with the collection of RTT samples from selected APs (e.g., FAPs and/or other MAPs) in the vicinity of the mobile network element, the estimation of the distance(s) from the mobile network element to each of the selected APs, and finally the determination of the geographic position of the mobile network element by identifying the most probable position on a road, given the distances from the mobile network element to each of the selected APs.

Figure 7:
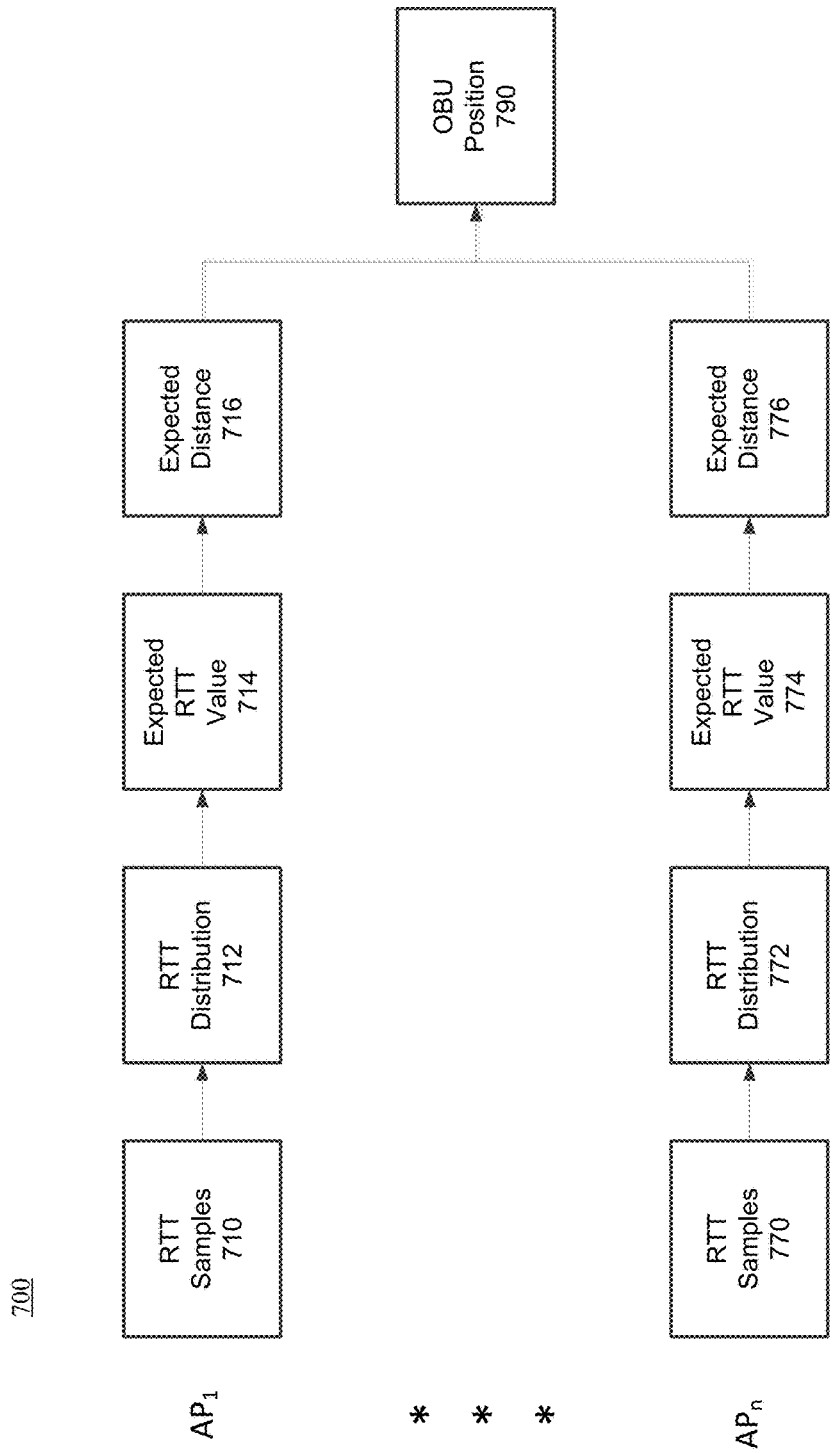
FIG. 7 is a block diagram illustrating a high-level example of a process that may be used by a mobile network element (e.g., an OBU) in determining its geographic position using multiple access points selected by the mobile network element of a network of moving things, in accordance with various aspects of the present disclosure.

FIG. 7 is a high-level block diagram 700 illustrating an example process that may be used by a mobile network element (e.g., an OBU) in determining its geographic position using multiple access points selected by the mobile network element of a network of moving things, in accordance with various aspects of the present disclosure. As previously described above, each vehicle capable of operating in a network of moving things may be equipped with an On-Board Unit (i.e., OBU) with wireless communication capabilities such as, for example, the ability to communicate with fixed and mobile APs using DSRC technology. As also discussed above, the abbreviation DSRC may be used herein to refer to the wireless communication standard also known as the Institute of Electrical and Electronics Engineers (IEEE) 802.11p standard, which is a part of IEEE P1556. It should again be noted that the use of DSRC in the present example does not represent a specific limitation of the present disclosure, and that other communication standards/recommendations/technologies may be employed, without departing from the scope of the present disclosure. In the mobile network element performing the process illustrated in FIG. 7, each neighboring AP (e.g., mobile or fixed $AP_1$ through $AP_n$ in FIG. 7) would also be equipped with compatible wireless communication capability (e.g., DSRC) and have associated known or estimated geographic coordinates. In the case of fixed APs, their geographic location may, for example, be determined using surveying techniques (e.g., using portable, high accuracy GNSS-based surveying units) or those fixed APs may, for example, include GNSS capabilities enabling them to accurately determine their own geographic coordinates (e.g., by analyzing/processing multiple samples of geographic location/coordinate information for the fixed AP). The geographic coordinates of the fixed APs may be stored at a particular network location such as, for example, a server accessible to and shared with all of the network elements via, for example, the data transport functionality of a network of moving things in accordance with various aspects of the present disclosure. In the case of mobile APs, the geographic coordinates of a mobile network element may be estimated using the method proposed here (or any other suitable method) and the geographic coordinates of that mobile network element may then be shared with mobile APs in the vicinity of that mobile network element via, for example, DSRC broadcasting.

In performing the process illustrated in FIG. 7, each mobile AP may, for example, send what are referred to herein as beaconing messages to selected APs in its vicinity and measure the RTT (blocks 710, 770) for each selected AP, which may be measured as the time spent from the instant the beaconing message is sent by the mobile AP, until the instant the acknowledgment of that beaconing message by the selected AP is received by the mobile AP. In accordance with various aspects of the present disclosure, the following process may be used by a particular mobile AP to select the APs to which beaconing messages are sent by that particular mobile AP. The mobile AP performing the process may first determine the number of fixed APs that are visible to the mobile AP. If the mobile AP determines that two or fewer fixed APs are visible, the mobile AP may select all visible fixed APs. However, if more than two fixed APs are visible, the mobile AP may, for example, choose up to five fixed APs from those fixed APs having the highest indication of received signal strength (RSSI) above a given a minimum RSSI threshold. If the mobile AP finds that less than two fixed APs were selected, the mobile AP may then select visible mobile APs that are currently broadcasting their own geographic locations, so that the total number of selected APs does not exceed five. Please note that this example process of AP selection is provided for illustrative purposes only, and that the use of additional or different vehicular context metrics may be considered in this selection process including, for example, vehicle speed, vehicle heading, and expected or estimated contact time or time window during which the mobile AP is expected to be able to communicate with the selected APs.

A mobile network element (e.g., an OBU/MAP) in accordance with various aspects of the present disclosure may, for example, use a calibration process to find the relationship between measured RTT to a given AP, and the actual physical distance to that AP. The calibration process may, for example, use a linear regression to estimate the relationship between RTT and physical distance, and may involve measuring RTT at known distances from the AP. For example, the geographic location of one or more FAP(s) may be determined using high precision geolocation equipment. A MAP may then be placed at different geographic locations where, for each location, RTTs may be measured, as described above, and the geographic location of the MAP may be determined with high precision geolocation equipment. Using such a technique, calculation of the distance between the FAP(s) and the MAP may be accomplished, and a relationship between physical distance and RTTs may be determined. The relationship between RTT and physical distance may be approximated by a linear regression such as, for example, distance=RTT×c/2+b, where the parameter, c, is the speed of light, and the parameter, b, is a calibration parameter that depends on a number of factors including, for example, the mobile network element radio(s), antenna(s), and the length(s) of cable(s) between the antenna connector(s) on the radio(s) and the connection(s) to the antenna(s) used to perform the measurements. For each MAP and FAP, calibration parameter, b, may be found via calibration. A professional-grade, differential GPS (DGPS) system may be used for measuring the distances that are used by the calibration process. The calibration parameter, b, may be calculated as b=bFAP+bMAP, where bFAP is a calibration parameter of the FAP of interest, and bMAP is a calibration parameter of the MAP of interest. Such calibration parameters may be determined using several different methods including, for example, performing a calibration as described above for two identical units A and B, where bA and bB=b/2. It should be noted that there is a tradeoff between the number of RTT measurements made and the accuracy of the resulting positioning information. The more RTT measurements that are made, the more accurate the resulting positioning information, until convergence occurs. In practice, a compromise may take into account an amount of capacity of the wireless network that the network operator chooses to allocate to positioning activities (e.g., RTT measurement messaging). In a system according to various aspects of the present disclosure, the calibration parameters discussed above may be shared by each node with neighboring nodes and/or a cloud-based system (e.g., the Cloud of FIG. 1) for delivery to/retrieval by nodes of the network. To support RTT-based position determination, in ideal situations, suitable antennas may be installed outside of the vehicle, e.g., on the roof of the vehicle. However, if antennas cannot be located outside of the vehicle body and are placed inside of the vehicle, signal propagation may be affected and, thus, calibration may also depend on such installation conditions.

In accordance with various aspects of the present disclosure, when two or more APs (e.g., fixed or mobile APs) are visible to a mobile network element (e.g., an OBU/MAP), a self-calibration process may be used that compares the physical distances from the mobile network element to selected APs, as measured using RTT ($d_{RTT}$), to the physical distances from the mobile network element to the selected APs using the computed geographic position ($d_{Pos}$) of the mobile network element and the known geographic position of each of the selected APs. The computed geographic position may be determined using multi-lateration, or the algorithm explained below. The difference between $d_{Pos}$ and $d_{RTT}$ may then be explained by calibration errors. This difference, $d_{diff}$, may then be used to directly adjust the calibration parameter b, (e.g., b=b+$d_{diff}$), making the system of the present disclosure self-calibrating. Multiple measurements (e.g., used to derive an average or median) may be used to make the above self-calibration more robust to outliers. A system in accordance with various aspects of the present disclosure may, for example, perform calibration using the known location of a mobile network node at a particular time during the operation of the mobile network node such as, for example, when an autonomous vehicle is known to be parked at a particular charging location/parking slot, the geographic location of which may be very precisely known by a survey using professional-grade satellite-based precision surveying equipment.

Figure 8:
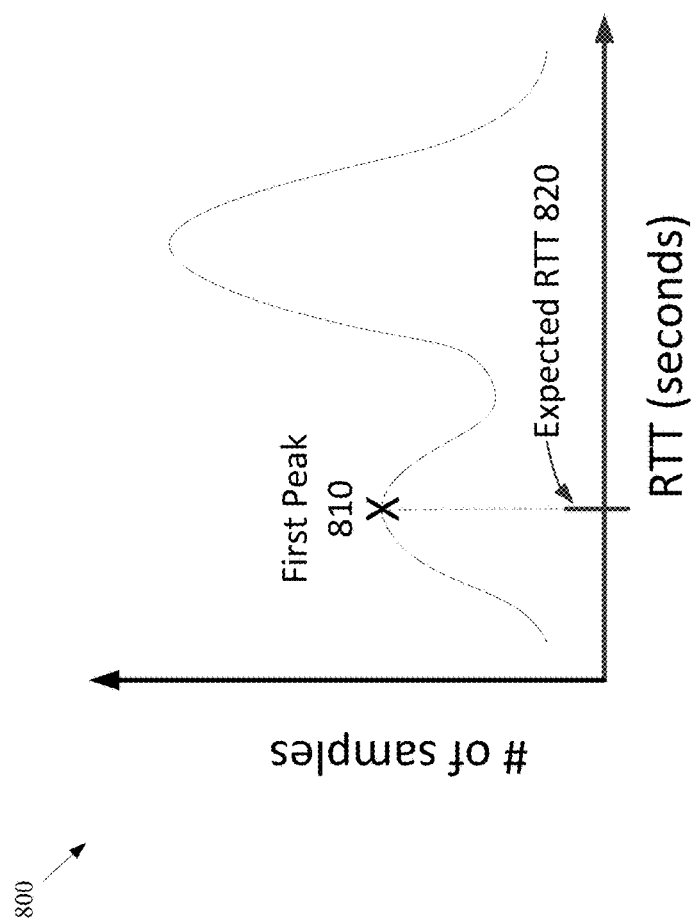
FIG. 8 is a graph illustrating the use of a first peak of the distribution of a population of RTT values in determining an expected RTT value for use in calculating distance between a mobile network element and a nearby AP, in accordance with various aspects of the present disclosure.

FIG. 8 is a graph illustrating the use of a first peak 810 of the distribution of a population of RTT values in determining an expected RTT value 820 for use in calculating distance between a mobile network element and a nearby AP, in accordance with various aspects of the present disclosure. Due to noise and multipath, a mobile network node (e.g., a mobile AP) may send multiple beacon messages to estimate a single wireless path distance to, for example, a fixed AP. Theoretically, the higher the number of beacon messages sent to measure RTT, the higher the accuracy of the resulting distance measurement. However, to avoid network congestion, the number of beacon messages used should be kept as low as possible without compromising accuracy. Thus, the optimal number of beacon messages to be used depends on the environment, the number of devices communicating over radio frequency band used, the capacity of the communication channel used, and the required measurement accuracy, and as such, may depend on the implementation. In accordance with some aspects of the present disclosure, the number of beacon messages may be increased as long as the addition of beacon messages produces an increase in RTT/positioning accuracy. In some systems, this approach may not be desirable, because such an approach may place a higher than acceptable load on the wireless communication channels. A compromise between positioning accuracy and number of beacon messages may be used, depending on the requirements of the operator/implementation. In some situations, RTT may be overestimated due, for example, to conditions such as multipath, which results in longer RF signal routes and longer resulting distance measurements. The proposed approach, which is illustrated in FIG. 8, finds the first, but not necessarily the highest peak of the RTT distribution shown in example graph 800, which corresponds to the shortest path (i.e., a straight line or LOS path) between the antenna of the vehicle OBU and the antenna of the AP. In some instances, it may be assumed that there is LOS from the antenna of the vehicle OBU to the AP, otherwise RSSI may be low. If this is not the case, however, the following aspects of the present approach help handle erroneous measurements. Other peaks that appear in the distribution of FIG. 8 may be related to common paths caused by signal reflection, which may actually be more predominant than the direct path when LOS is compromised. To decrease the impact of noise in the measurements when finding the peaks, the distribution of RTT may be smoothed using methods such as signal convolution or kernel density estimation, in accordance with some aspects of the present disclosure.

A different approach in accordance with aspects of the present disclosure may, instead of finding the first peak, find the percentile of the distribution that best approximates the first peak, which may be a simpler approach to this problem. Because there may be a tendency to overestimate RTT, this may be a percentile that is inferior to 50 (i.e., inferior to the median), which may be estimated based on a training dataset. This approach may be more sensitive to multi-path and, therefore, to local conditions than the one proposed above, but is superior to approaches based on central statistics like the median, which may overestimate the distance, and the mean, which may be very sensitive to outliers. Once the distances from a mobile network element (e.g., an OBU/MAP of a vehicle) to a set of APs are known, the calculation of the geographic position may be done in several different ways. One example approach is the use of multilateration, which is discussed below with regard to FIG. 9.

Figure 9:
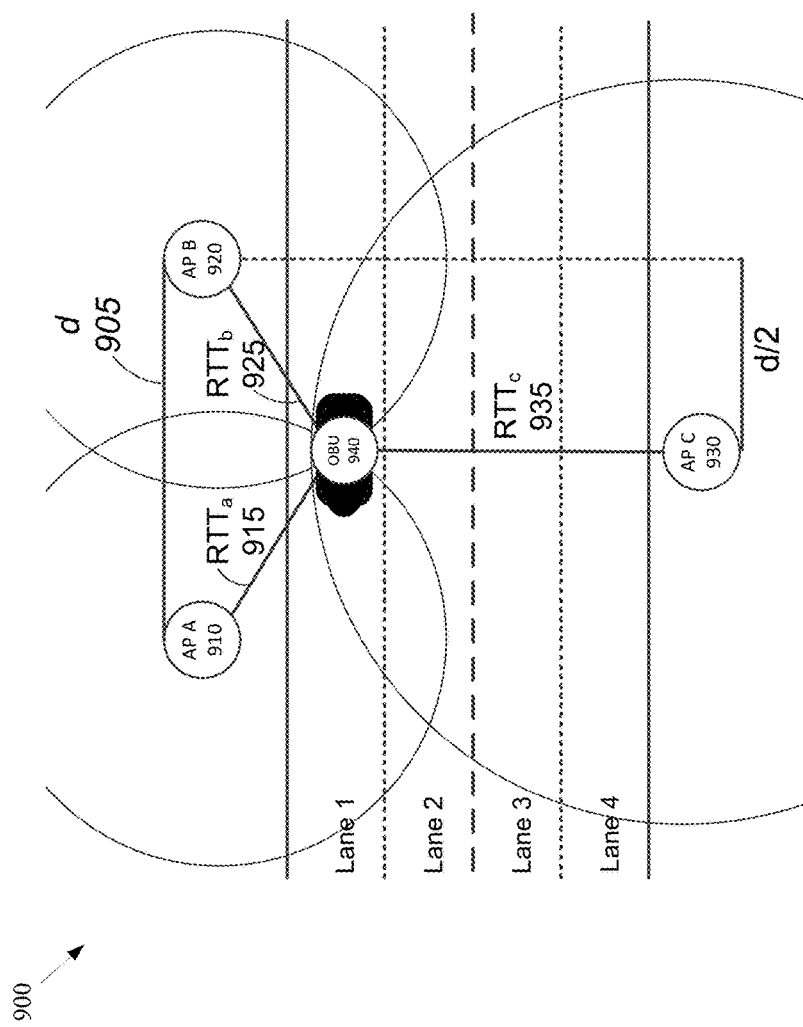
FIG. 9 is an illustration of an example situation involving a single vehicle on a multilane highway, in which a vehicle with OBU is in radio communication with three fixed APs during the determination of the distances using RTT measurements between the antenna of the vehicle OBU and the antennas of the three fixed APs, in accordance with various aspects of the present disclosure.

FIG. 9 is an illustration of an example situation involving a single vehicle on a multilane highway, in which a vehicle with OBU 940 is in radio communication with three fixed APs 910, 920, 930 during the determination of the distances using RTT measurements between the antenna of the vehicle OBU 940 and the antennas of the three fixed APs, in accordance with various aspects of the present disclosure. It should be noted that although FIG. 9 illustrates an example in which a moving network element (i.e., OBU 940) is in the vicinity of and communicates with three fixed network elements (i.e., APs 910, 920, 930) in order to determine a geographic position, also referred to herein as a geographic location, this example does not represent a specific limitation of the present disclosure, in that a greater or lesser number of fixed network elements, no fixed network elements, or information from other moving network elements may be employed in performing the geolocation processes described herein. Multilateration is one approach that may be used if the discrepancy between the distance, d 905, and the width of the road is small. However, if distance, d 905, is much greater than the width of the road (which may occur due to the fact that APs employing some radio frequency technologies may be placed up to 1 kilometer apart), the use of multilateration may place the estimated geographic position of the vehicle outside of the width of the road, due to dilution of precision in the axis that traverses the road. However, a different strategy may be employed by a network of moving things in accordance with aspects of the present disclosure, to overcome such shortcomings.

Figure 10:
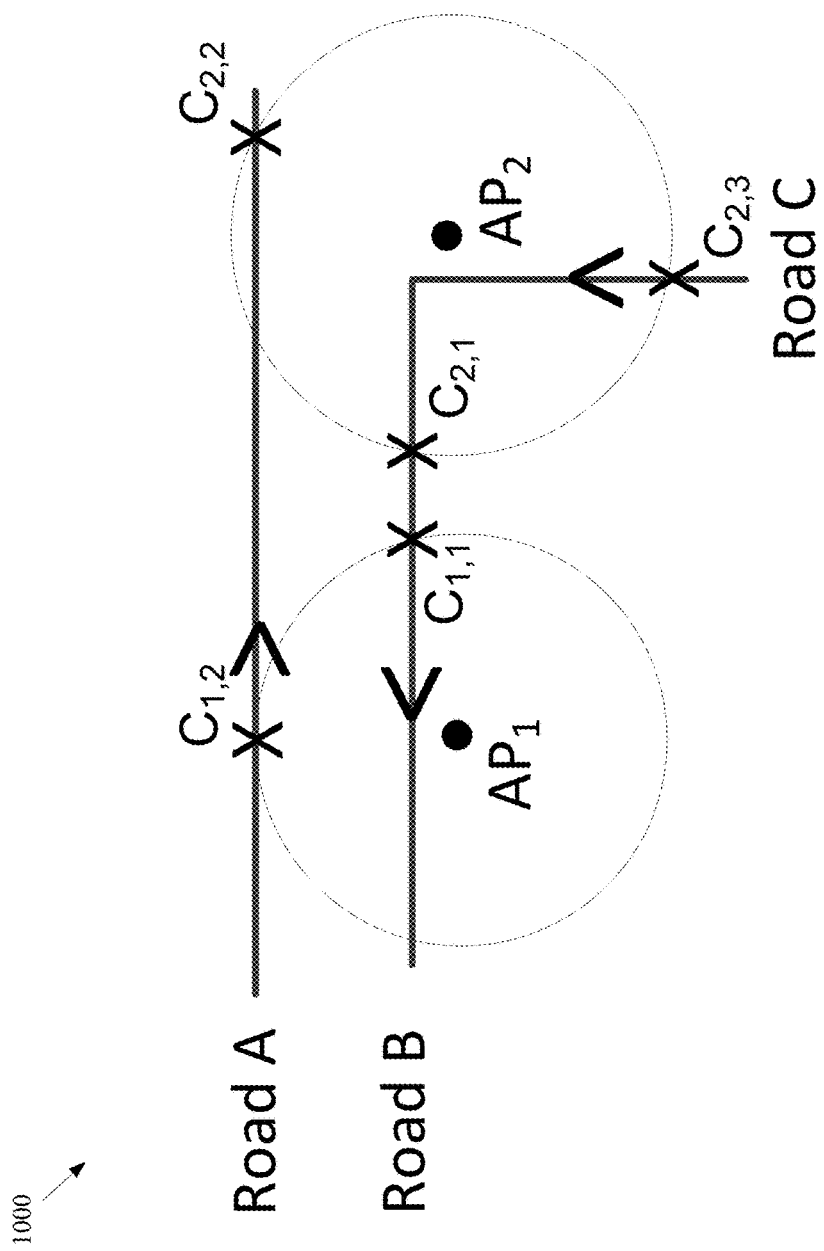
FIG. 10 is an illustration of an improved approach to determining the geographic location of a moving network element such as, for example, a vehicle, in accordance with various aspects of the present disclosure.

FIG. 10 is an illustration of an improved approach to determining the geographic location of a moving network element such as, for example, a vehicle, in accordance with various aspects of the present disclosure. As shown in the example illustrated in FIG. 10, a road may, for example, be represented by a road map dataset of line segments, in which each line segment represents the location of, for example, the center line of a portion of a road or the centerline of one lane of a portion of a road. A circle centered about each of the APs used by the moving network element (e.g., a mobile AP) to perform RTT distance measurements may then be generated, where the radius of the circle represents the distance measured between that AP and the moving network element using the corresponding RTT. The intersection(s) of the circle for each AP with the line segments representing the road portion(s) of the road map dataset may generate one or more possible geographic locations that are candidates at which the moving network element may be located. All possible combinations consisting of one candidate geographic location for each of the APs may then be generated and evaluated to identify the combination of candidate geographic positions that minimizes the standard deviation of the position coordinates, i.e., the combination where geographic location candidates are closer to each other (e.g., combination ($C_{1,1}$, $C_{2,1}$) in FIG. 10). The final result for an estimated current geographic location of the moving network element (i.e., vehicle with OBU—a mobile AP) may then be found by combining (e.g., averaging) the geographic locations of the candidate circle-road intersections that are more likely to represent the current geographic location coordinates of the moving network element (i.e., the vehicle with OBU), in the example of FIG. 10, averaging the geographic location coordinates of ($C_{1,1}$, $C_{2,1}$). In accordance with various aspects of the present disclosure, combining of the geographic location coordinates may involve weighting the candidate geographic location coordinates according to a degree of confidence on the measurements by the associated AP, which may be determined using metrics of signal quality (e.g., signal-to-noise ratio (SNR)), signal strength (e.g., RSSI), and variation of RTT in the collected samples.

In comparison to basic multilateration, the proposed approach described above decreases the number of APs used in the calculation of the geographic location of a moving network element to two in most of the cases, and may reduce the number to one, if a system using historical information or prediction is used. For example, a system using historical and/or prediction information may be fed data advertised by the Cloud, or by fixed APs, mobile APs, and/or clients/users/sensors, or data available from geographic location surveys already done in the past, either in the same geographic location, or in another region with similar context to that which the mobile AP is experiencing such as, for example, in terms of density of mobile APs, density of fixed APs, obstructions, etc. The historical or prediction information, advertised by the Cloud, may be used to aid moving network elements (e.g., a vehicle with OBU) in determining which APs they need to consider when receiving information from multiple APs, in which the moving network element may have LOS conditions with some APs, and non-LOS (NLOS) conditions with other APs. By receiving such information, the OBUs may rank the APs based on their LOS or NLOS status, and may do a pre-selection of the APs before running the local algorithm to determine the distance between the OBU and the APs.

In addition, a network of moving things in accordance with various aspects of the present disclosure may employ filtering methods such as, for example, Kalman Filters, which may be used to smooth physical distance estimation for each AP and to smooth geographic location estimation. Further, information from inertial sensors/systems, vehicle on-board diagnostics (OBD) data such as, for example, vehicle speed/velocity information, wheel rotation sensor information, GNSS data, wireless fingerprinting of Wi-Fi and other wireless signals, and information from cellular-based geolocation systems may all be combined with this technique using data fusion approaches employing, for example, Kalman or particle filters, taking advantage of multiple sources of information.

The accuracy of satellite-based positioning systems, frequently referred to as global navigation satellite systems (GNSS), is a major issue that affects many businesses, including transportation of people and goods, security, public safety, etc. This problem is exacerbated in large cities due to the presence of tall buildings where GNSS positioning errors may be large. Aspects of the present disclosure help to improve GNSS location accuracy by taking advantage of fixed APs at known geographical locations and mobile APs (e.g., on vehicles) that use the known geographic locations of the fixed APs and other sources of information to improve positioning accuracy. By improving positioning accuracy and precision, users may discriminate events such as a vehicle being stopped in traffic vs. having arrived at a particular destination, and to better track vehicles in tunnels, precision tolling, and more accurate geo-fencing, as well as to calculate better estimates of time of arrival and build better models based on geo-referenced data.

By employing the techniques described above in accordance with various aspects of the present disclosure, the users may experience improved vehicle lane detection and distance estimation, even when vehicles are very close to the fixed APs used as geographic position references and paths of wireless communication. A system in accordance with various aspects of the present disclosure provides improved geographic positioning knowledge sharing, so that vehicles may improve determination of their own geographic locations by using information exchanged with other vehicles. A system according to various aspects of the present disclosure may use a wireless broadcasting/multicasting approach for the communication of various network elements with one another, rather than only peer-to-peer exchanges, and thereby consumes much less bandwidth than other approaches. In a system according to aspects of the present disclosure, the fixed APs may act as the active agents in the determination of the geographic location of moving network elements, instead of or in addition to the OBUs.

FIGS. 11A-11D are a flowchart of an example method of determining a geographic location of a mobile network node using round-trip time of radio frequency signals communicated among nodes of a network of moving things, in accordance with various aspects of the present disclosure. The following discussion of the actions of FIGS. 11A-11D makes reference to elements of FIGS. 1-10. The example method of FIGS. 11A-11D may, for example, be performed by one or more processors of system of a mobile network node such as, for example, the elements identified above as an on-board unit (OBU) and/or a mobile AP, in accordance with aspects of the present disclosure. The one or more processors may be dedicated to perform the example method, or the method may be performed as one or more processes or threads performed on a regular or intermittent basis, that share the one or more processors with other processes/threads.

Figure 11A:
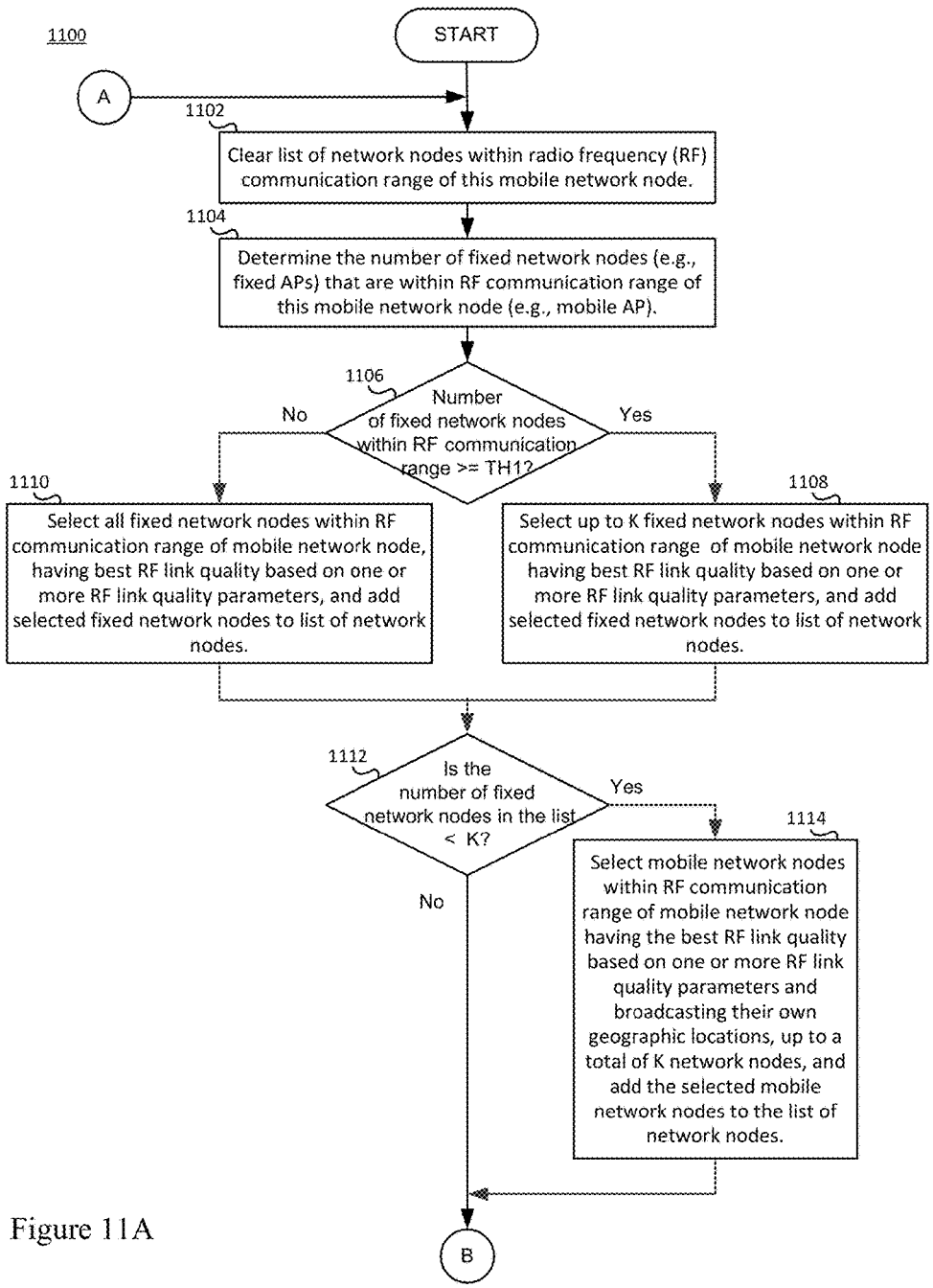
FIGS. 11A-11D are a flowchart of an example method of determining a geographic location of a mobile network node using round-trip time of radio frequency signals communicated among nodes of a network of moving things, in accordance with various aspects of the present disclosure.

The method of FIGS. 11A-11D begins at block 1102 of FIG. 11A, where the method initializes or clears a list of information for nodes of a network of moving things, such as the network described herein. The list may be stored in a portion of the memory of a mobile network node that may also be used to store context information that identifies network nodes that are within radio frequency (RF) communication range of the mobile node of the network such as, for example, the elements described above as OBUs and MAPs including, for example, quality information (e.g., RSSI, SNR, etc.) for RF signals received by the mobile network from other nodes of the network within wireless communication range. Additional details of such context information in accordance with various aspects of the present disclosure may be found, for example, in U.S. patent application Ser. No. 15/481,732, titled "Systems and Methods for Managing the Scheduling and Prioritizing of Data in a Network of Moving Things," filed on Apr. 7, 2017, which is hereby incorporated herein, in its entirety. Then, at block 1104, the mobile network node may determine the number of fixed network nodes (e.g., fixed APs) that are within RF communication range of the mobile network node.

Next, at block 1106, the method may determine whether the number of fixed network nodes within RF communication range of the mobile network node is greater than or equal to a certain threshold, TH1. If it is determined, at block 1106, that the number of fixed network nodes (e.g., fixed APs) within RF communication range of the mobile network node is greater than or equal to the certain threshold, TH1, the method of FIG. 11A may then, at block 1108, select up to a certain number, K, of fixed network nodes within RF communication range of the mobile network node having a best link quality, based on one or more RF link quality parameters or measurements, and may add the selected fixed network nodes to the list of network nodes. The method may then proceed to block 1112, described below. If, however, at block 1106, the number of fixed network nodes (e.g., fixed APs) within RF communication range of the mobile network node is not greater than or equal to the certain threshold, TH1 (e.g., two), the method of FIG. 11A may, at block 1110, select all of fixed network nodes within RF communication range of the mobile network node having a best link quality, based on one or more RF link quality parameters or measurements, and may add the selected fixed network nodes to the list of network nodes. The method may then proceed to block 1112, described below.

At block 1112, the method of FIGS. 11A-11D may determine whether the number of fixed network nodes in the list of network nodes is less than the certain number, K. If, at block 1112, it is determined that the number of fixed network nodes in the list of network nodes is equal to the certain number, K, the method may proceed to block 1116 of FIG. 11B, described below. If, however, it is determined, at block 1112, that the number of fixed network nodes in the list of network nodes is less than the certain number, K, the method may proceed to block 1114. At block 1114, the method may select mobile network nodes (e.g., OBUs/MAPs) within RF communication range of mobile network node having the best RF link quality, based on the one or more RF link quality parameters or measurements, and that a determination mobile network nodes are broadcasting their own geographic locations that are received by this mobile network node, up to a total of K network nodes, and may add the selected mobile network nodes to the list of network nodes. The method may then continue at block 1116 of FIG. 11B, described below.

Figure 11B:
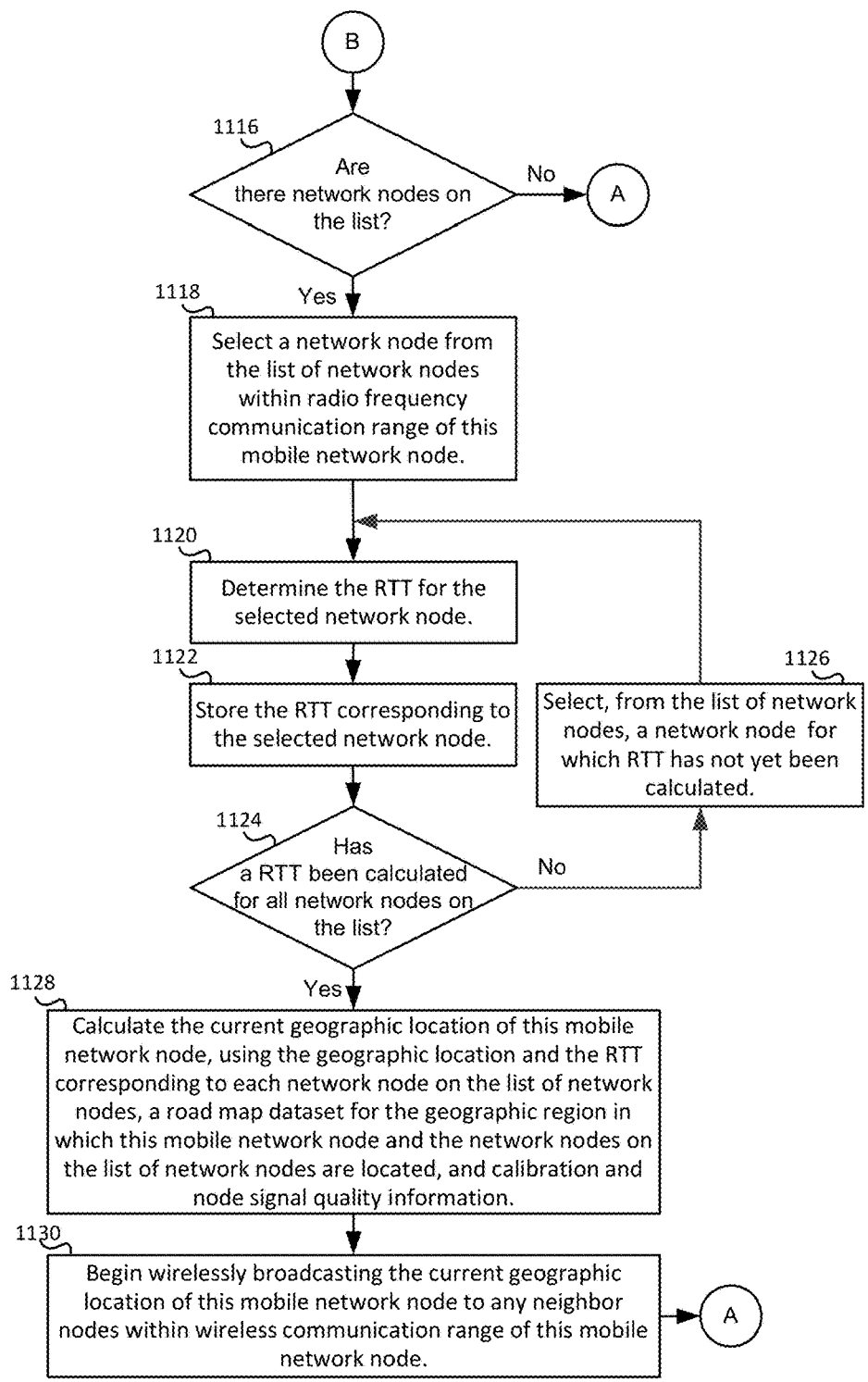
Figure 11C:
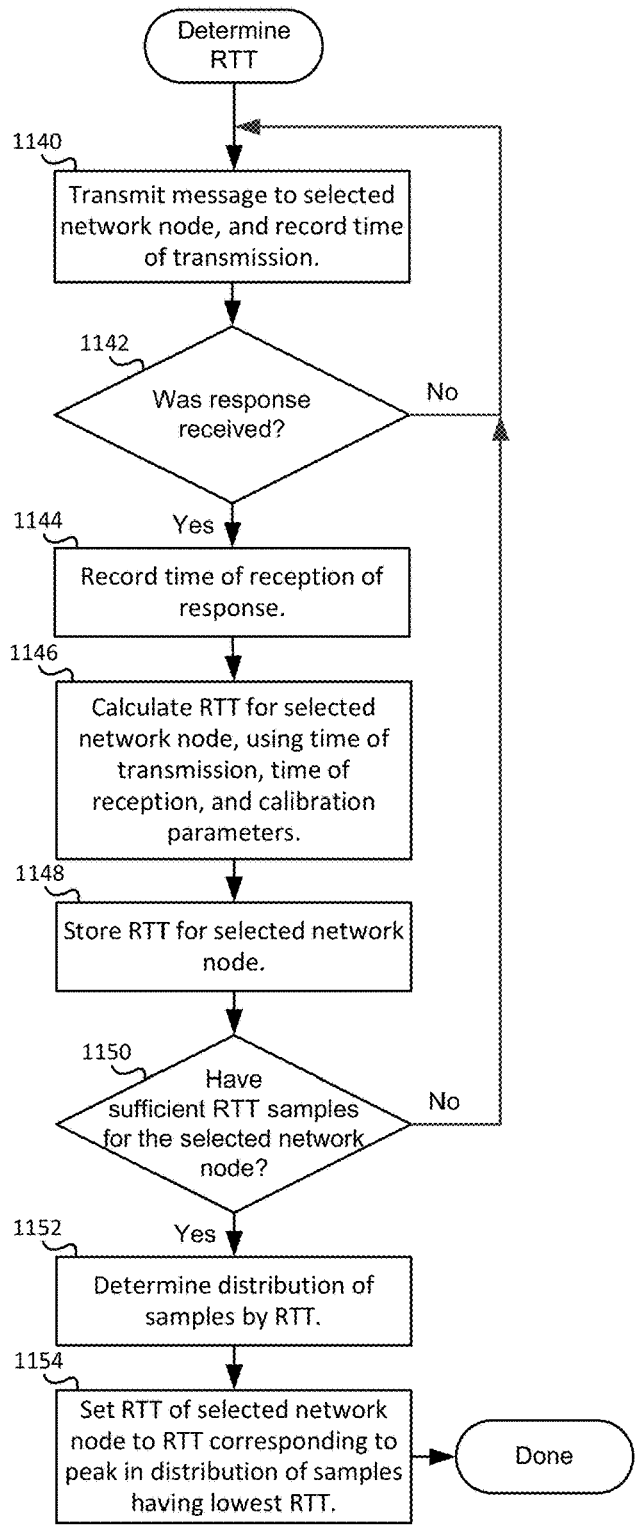

At block 1116 of FIG. 11B, the processor performing the method may determine whether there are any network nodes on the list of network nodes within RF communication range of the mobile network node (i.e., whether the mobile network node currently has any neighbor nodes with which the mobile network node is within RF communication range). If the list of network nodes is empty, the method may returns to block 1102 of FIG. 11A, and may continue to scan for neighbor nodes (i.e., other nodes within wireless communication range). If, however, at block 1116, the mobile network node determines that the list of network nodes is not empty then, at block 1118, the mobile network node may select a network node from the list of network nodes within radio frequency communication range of this mobile network node, and at block 1120, may determine the RTT between the mobile network node and the selected network node. Additional details of an example sequence of actions for determining RTT in accordance with aspects of the present disclosure are shown in FIG. 11C, described below. Ideally, the process of performing RTT measurements is completed within a short time window (e.g., a few tens or few hundreds of milliseconds), because the MAP is located on a vehicle, which may move or be moving. For example, if the process of collecting RTT samples takes just one second, the vehicle in which the MAP is located may travel fifty or more feet within that time frame. To overcome this problem, a system in accordance with various aspects of this disclosure may perform speed compensation such as, for example, using an external source of speed data (e.g., vehicle speed information from a vehicle on-board diagnostic interface port (e.g., OBD/OBD II), using vehicle speed information derived from GNSS/GPS information, or derived from the RTT data). Then, at block 1122, the method may store the RTT corresponding to the selected network node.

Figure 11D:
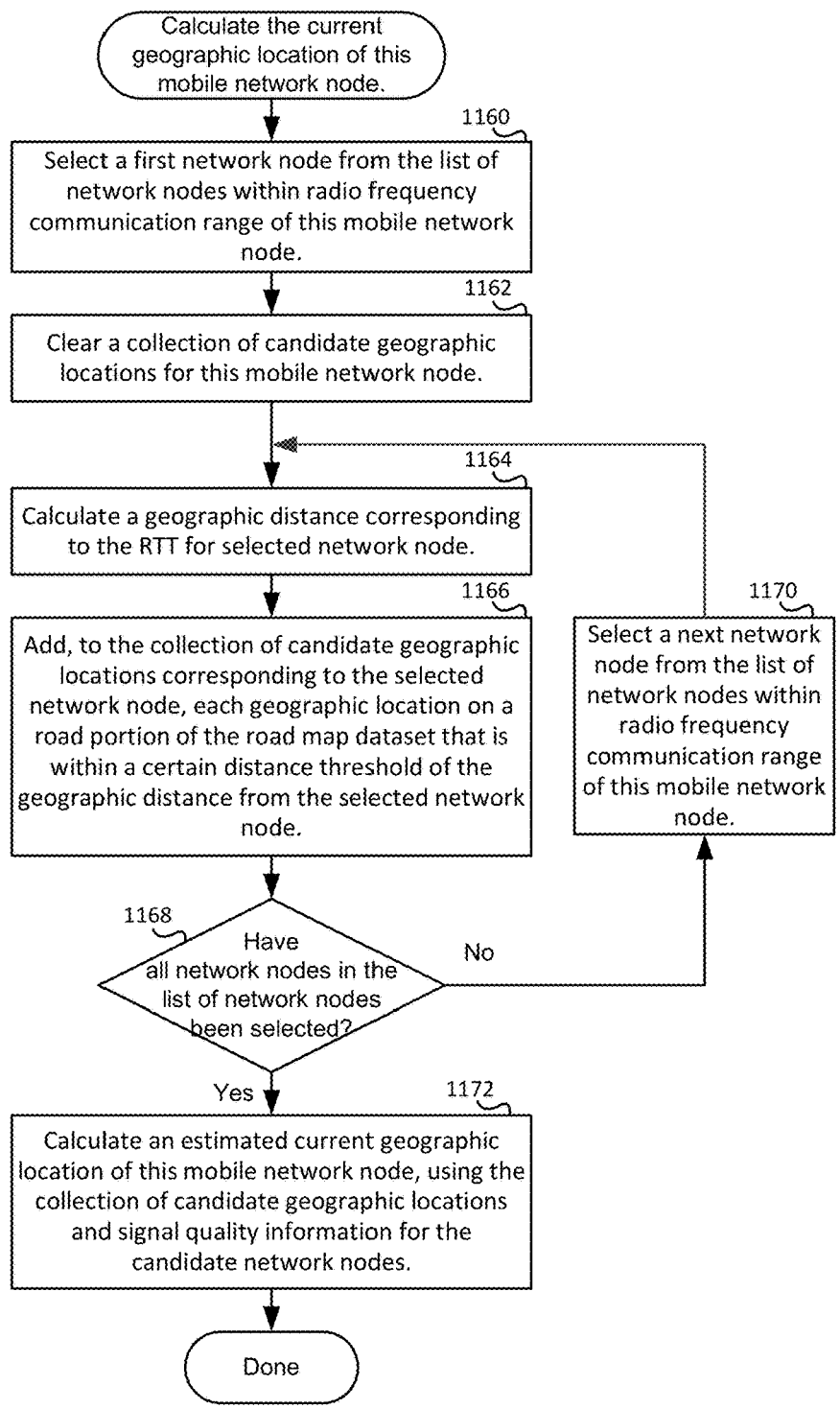

Next, at block 1124, a determination may be made as to whether an RTT value has been calculated for all network nodes on the list of network nodes. If it is determined that an RTT value has not been calculated for all network nodes on the list, then at block 1126, the method may select, from the list of network nodes, a network node for which an RTT has not yet been determined, and control may then pass to block 1120, described above. If, however, it is determined, at block 1124, that an RTT value has been calculated for all network nodes on the list, then at block 1128, the processor performing the method may calculate the current geographic location of the mobile network node, using the geographic location and the RTT corresponding to each network node on the list of network nodes. Such calculation may, for example, use a road map dataset for the geographic region in which this mobile network node and the network nodes on the list of network nodes are located, received signal quality information for the networks nodes of the list, and calibration information for the mobile network node and the network nodes on the list. Further details of an example sequence of actions for calculating a geographic location of a mobile network node, such as the calculation of block 1128, is shown in FIG. 11D, described below.

Following completion of the actions of block 1128, the method of FIGS. 11A-11D may then, at block 1130, cause the mobile network nodes to begin wirelessly broadcasting the current geographic location calculated for this mobile network node to any neighbor nodes within RF wireless communication range of the mobile network node. The method then loops back to block 1102 of FIG. 11A, described above.

FIG. 11C is a flowchart providing additional details of an example method for determining round-trip time (RTT) that may correspond to, for example, block 1120 of FIG. 11B, in accordance with various aspects of the present disclosure. The example method of FIG. 11C begins at block 1140, where the processor, circuitry and/or logic of the network node performing the determination of RTT transmits a message to a selected other network node (e.g., a mobile AP/OBU or fixed AP), and records an indication of the time at which the transmission occurred corresponding to the selected network node. Next, at block 1142, the method determines whether a response to the transmitted message was received, e.g., within a certain amount of time. The certain amount of time may, for example, correspond to a maximum round-trip time for a response from a network node located at a certain physical line-of-sight distance from the transmitting network node. Although not shown in FIG. 11C, a check may be made to determine whether the network node performing the RTT determination has attempted a certain maximum number of transmissions to the selected network node in order to determine a valid RTT. Such a check may be used because some of the nodes of a network as described herein (e.g., mobile APs/OBUs) may move at any time, and the network node performing the RTT determination may at one point in time be within RF communication range of another network node, and may very shortly thereafter no longer be within RF communication range of that other network node, not as a result of a distance between the method performing the determination, but because of a rapid change in RF path attenuation (blockage) or multipath.

If, at block 1142, it is determined that a response to the transmitted message was received, then at block 1144, the time at which the response was received is recorded as corresponding to the selected network node. Signal quality information (e.g., RSSI, SNR, etc.) and calibration information for the network node performing the determination, and the identity of the selected network node, may also be made a part of the record of the determination of round-trip time with the selected network node, at the node performing the RTT determination.

Next, at block 1146, the method of FIG. 11C may calculate an RTT value for the selected network node using, for example, the time of transmission, time of reception, RF signal quality information, and calibration parameters. The RTT value may, for example, be calculated as the difference between the time of reception minus the time of transmission, less the RF path-delay related calibration parameters for the transmitting network node and the selected (i.e., receiving) network node. The calibration information for the network node performing the RTT determination may, for example, be the result of self-calibration, while the calibration information for the selected network node may, for example, be determined by the selected network node (e.g., using self-calibration) and sent as part of the response to the message transmitted by the network node performing the RTT determination, may be regularly or intermittently broadcast by the selected node, or may be accessed from a remote, Cloud-base system by the network node performing the RTT determination.

At block 1148, the network node performing the RTT determination may then store the determined RTT value for the selected network node, along with any additional information (e.g., calibration information, signal quality information) received from the selected network node or measured by the network node, using the received response. Then, at block 1150, the method of FIG. 11C may determine whether the network node performing the method has sufficient RTT samples have been acquired/determined. If sufficient RTT values have not been acquired/determined, the method may then loop back to block 1140, described above, to acquire/determine an additional RTT sample value. If, however, it is determined, at block 1150, that sufficient RTT samples have been acquired/determined, the method of FIG. 11C continues at block 1152.

At block 1152, the method of FIG. 11C may determine a distribution of number of RTT samples by RTT value (e.g., data of a histogram, a line graph, or an equivalent representation of a number of RTT samples by RTT value), and may then, at block 1154, set the RTT corresponding to the selected network node to be an RTT value having the lowest RTT value that corresponds to a peak number of RTT samples in the distribution, as discussed above with regard to FIG. 8. It should be noted that the peak in the distribution of RTT samples having the lowest RTT may not be the highest amplitude peak in the distribution, as shown in the example of FIG. 8. The example method of FIG. 11C then passes control to block 1122 of FIG. 11B, described above.

FIG. 11D is a flowchart of a sequence of actions of an example method of calculating a geographic location of a network node using RTT information, in accordance with various aspects of the present disclosure. The method of FIG. 11D may correspond to, for example, the actions of block 1128 of FIG. 11B, described above. The actions of FIG. 11D begin at block 1160, where the network node performing the method may select a first network node from the list of network nodes within radio frequency communication range of this mobile network node (e.g., a mobile AP/OBU). Next, at block 1162, the method may clear or initialize storage for a collection of candidate geographic locations for this mobile network node, so that the collection is empty.

Next, at block 1164, the method may calculate a geographic distance corresponding to the RTT value for the selected network node. The RTT value for the selected network node may, for example, be determined/calculated as discussed above with regard to block 1146 of FIG. 11C. Then, at block 1166 of FIG. 11D, the method may add, to the collection of candidate geographic locations corresponding to the selected network node, each geographic location on a road portion of the road map dataset that is within a certain distance threshold of the geographic distance from the selected network node. An example road map dataset may, for example, comprise one or more line segments (e.g., straight line segments or curved line segments/splines) and corresponding geographic location coordinate information, each line segment representing a portion of a road within a geographic region that is covered by the road map dataset.

At block 1168, a determination may be made as to whether all network nodes in the list of network nodes have been selected. If it is determined, at block 1168, that not all nodes of the list of network nodes have been selected, the method of FIG. 11D may continue at block 1170, where the method may select a next network node from the list of network nodes within radio frequency communication range of this mobile network node. The method then continues at block 1164, described above. If, however, it is determined, at block 1168, that all nodes of the list of network nodes have been selected, the method of FIG. 11D may continue at block 1172.

At block 1172, the method may calculate an estimated current geographic location of this mobile network node, using the collection of candidate geographic locations, and signal quality or other context information for the candidate network nodes and the mobile network node. As described above with regard to block 1128, the calculation may, for example, combine the geographic location information for the candidate network nodes. In accordance with various aspects of the present disclosure, the combining may include determining a statistical measure of the closeness or proximity of the geographic locations of the candidate network nodes such as, for example, a standard deviation, variance, average, or other suitable statistical measure that may be used to weight or select the candidate network nodes whose geographic location information (e.g., coordinates) may be used in calculating an estimate of the geographic location of the mobile network node. For example, calculation of the estimated geographic location of the mobile network node may determine a subset of candidate network nodes whose geographic location coordinates have the lowest standard deviation of all such subsets. In calculating the estimated geographic location of the mobile network node from the geographic coordinates of the candidate network nodes of the collection, the geographic coordinates may be combined as a weighted average, where the weight applied to the geographic coordinates of a given candidate network node is according to a confidence value for the RTT value measured using that given candidate network node. The confidence value for each candidate network node may, for example, be determined using signal quality or other context information of the mobile network node and/or the candidate network node. Following the calculation of the estimate of geographic location of the mobile network node, at block 1172 of FIG. 11D, the method of FIG. 11A-11D continues at block 1130 of FIG. 11B, described above.

In accordance with various aspects of the present disclosure, systems and methods are provided that manage a vehicle communication network, in accordance with the location of network nodes and end-user/edge devices, in a way that provides for stable TCP/IP Internet access, among other things. For example, an end user may be provided with a clean and stable Wi-Fi Internet connection (e.g., IEEE 802.11a/b/g/n/ac/ad/af) that may appear to the end user to be the same as the Wi-Fi Internet connection at the end-user's home; at the end-user's workplace; at fixed, public Wi-Fi hotspots; etc. For example, for an end user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although an end user might always be connected to a single Wi-Fi AP of a vehicle, the vehicle (or the access point thereof, for example an OBU/MAP) may be moving between multiple access points (e.g., fixed APs, other mobile APs, cellular base stations, fixed Wi-Fi hotspots, etc.). For example, mobility management implemented in accordance with various aspects of the present disclosure supports the mobility of each vehicle and its end users across different communication technologies (e.g., IEEE 802.11p, cellular (e.g., 3G, 4G LTE, 5G, UMTS), Wi-Fi (e.g., IEEE 802.11a/b/g/n/ac/ad/af), etc.) as the mobile APs migrate among fixed APs (and/or mobile APs) and/or as users migrate between mobile APs.

In accordance with various aspects of the present disclosure, a mobility controller (MC), which may also be referred to as an LMA or Network Controller (NC), may monitor the location (e.g., network location, geographic location, etc.) of various nodes (e.g., mobile APs, etc.) and/or the location of end users connected through such nodes. The mobility controller (MC/NC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., fixed APs and/or mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application may run in the background, managing the available networks and/or nodes thereof and selecting the one that best fits, and then triggering a handoff to the selected network (or node thereof) before breakdown of the current connection.

The communication network of the present disclosure (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Various aspects of the present disclosure may be seen in a method of determining a geographic location of a first mobile node within a service area of a wireless network comprising a plurality of nodes including fixed nodes having a constant geographic location and mobile nodes able to move over roads of the service area. Each node of the wireless network may comprise one or more storage devices for storing geographic location information and messages, and at least one radio frequency interface for wirelessly transmitting messages to and receiving messages from other nodes of the plurality of nodes. Such a method may comprise selecting up to a certain maximum total number of nodes from the plurality of nodes to produce a list of nodes, where the selected nodes may be within wireless communication range of the first mobile node; and determining a corresponding round trip time between the first mobile node and each of the nodes of the list of nodes. The method may also comprise calculating an estimated geographic location of the first mobile node using a road map dataset and the round trip times corresponding to the nodes of the list of nodes; and broadcasting the estimated geographic location of the first mobile node to the plurality of nodes.

In accordance with various aspects of the present disclosure, the selecting may comprise determining, by the first mobile node, a number of fixed nodes of the wireless network that are within wireless communication range of the first mobile node. The method may also comprise first adding to the list of nodes up to the certain maximum total number of nodes according to one or more measures of wireless signal quality, those fixed nodes of the wireless network that are within wireless communication range of the first mobile node. The method may further comprise second adding to the list of nodes, after the first adding, up to the certain maximum total number of nodes according to the one or more measures of wireless signal quality, those mobile nodes of the wireless network that are within wireless communication range of the first mobile node, if the number of nodes in the list of nodes after the first adding is less than the certain maximum total number of nodes. Determining the corresponding round trip time between the first mobile node and each of the nodes of the list of nodes may comprise calculating a plurality of round trip time sample values for the first mobile node and a particular node of the list of nodes to produce a corresponding plurality of round trip time values for the particular node. Such a calculation may include using timing of messages transmitted by the first mobile node to the particular node, responses received from the particular node by the first mobile node, and calibration information produced by one or both of the first mobile node and the particular node. Determining the corresponding round trip time between the first mobile node and each of the nodes of the list of nodes may also comprise determining a distribution of the round trip time sample values for the particular node; and setting the corresponding round trip time for the particular node to a respective round trip time of a peak in the distribution having a lowest round trip time.

In accordance with various aspects disclosed herein, calculating the estimated geographic location of the first mobile node may comprise, for each particular node in the list of nodes, calculating a geographic distance corresponding to the round trip time of the particular node of the list of nodes; determining one or more candidate geographic locations of the first mobile node, using the geographic distance corresponding to the particular node and geographic location information associated with road portions of the road map dataset; and combining the one or more candidate geographic locations to produce the estimated geographic location of the first mobile node. Combining the one or more candidate geographic locations of the first mobile node may comprises calculating a weighted average of geographic coordinate information for two or more candidate geographic locations, wherein a weight applied to the geographic coordinate information for a particular candidate geographic location may be according to one or more measures of wireless signal quality corresponding to a node of the list of nodes used to determine the particular candidate geographic location. Combining the one or more candidate geographic locations of the first mobile node may comprises calculating a statistical measure of the proximity of the one or more candidate geographic locations; and discarding a candidate geographic location of the one or more candidate geographic locations, based on the statistical measure. Broadcasting the estimated geographic location of the first mobile node to the plurality of nodes may comprise periodically transmitting a current estimated geographic location for reception by any node within wireless communication range of the first mobile node.

Additional aspects of the present disclosure may be found in a system for determining a geographic location of a first mobile node within a service region of a wireless network comprising a plurality of nodes including fixed nodes having a constant geographic location and mobile nodes able to move over roads of the service area. Such a system may comprise one or more processors configured for communicatively coupling to one or more storage devices for storing geographic location information and messages, and at least one radio frequency interface for wirelessly transmitting messages to and receiving messages from other nodes of the plurality of nodes. In such a system, the one or more processors may be operable to, at least, perform the actions of a method such as that described above.

Further aspects of the present disclosure may be observed in a non-transitory computer-readable medium having stored thereon a computer program having a plurality of code sections, where each code section may comprise a plurality of instructions executable by one or more processors. The executable instructions may cause the one or more processors to perform actions of a method for determining a geographic location of a first mobile node within a service region of a wireless network comprising a plurality of nodes including fixed nodes having a constant geographic location and mobile nodes able to move over roads of the service area. Each node of such a wireless network may comprise one or more storage devices for storing geographic location information and messages, and at least one radio frequency interface for wirelessly transmitting messages to and receiving messages from other nodes of the plurality of nodes. The steps of such a method may comprise the steps/actions of the method set forth above.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of determining a geographic location of a first mobile node within a service area of a wireless network comprising a plurality of nodes including fixed nodes having a constant geographic location and mobile nodes able to move over roads of the service area, wherein each node of the wireless network comprises one or more storage devices for storing geographic location information and messages, and at least one radio frequency interface for wirelessly transmitting messages to and receiving messages from other nodes of the plurality of nodes, the method comprising:
    selecting up to a certain maximum total number of nodes from the plurality of nodes to produce a list of nodes, wherein the selected nodes are within wireless communication range of the first mobile node;
    determining a corresponding round trip time between the first mobile node and each of the nodes of the list of nodes;
    calculating an estimated geographic location of the first mobile node using a road map dataset and the round trip times corresponding to the nodes of the list of nodes; and
    broadcasting the estimated geographic location of the first mobile node to the plurality of nodes.

2. The method according to claim 1, wherein the selecting comprises:
    determining, by the first mobile node, a number of fixed nodes of the wireless network that are within wireless communication range of the first mobile node;
    first adding to the list of nodes up to the certain maximum total number of nodes according to one or more measures of wireless signal quality, those fixed nodes of the wireless network that are within wireless communication range of the first mobile node; and second adding to the list of nodes, after the first adding, up to the certain maximum total number of nodes according to the one or more measures of wireless signal quality, those mobile nodes of the wireless network that are within wireless communication range of the first mobile node, if the number of nodes in the list of nodes after the first adding is less than the certain maximum total number of nodes.

3. The method according to claim 1, wherein determining the corresponding round trip time between the first mobile node and each of the nodes of the list of nodes comprises:

calculating a plurality of round trip time sample values for the first mobile node and a particular node of the list of nodes to produce a corresponding plurality of round trip time values for the particular node using timing of messages transmitted by the first mobile node to the particular node, responses received from the particular node by the first mobile node, and calibration information produced by one or both of the first mobile node and the particular node;

determining a distribution of the round trip time sample values for the particular node; and setting the corresponding round trip time for the particular node to a respective round trip time of a peak in the distribution having a lowest round trip time.

4. The method according to claim 1, wherein calculating the estimated geographic location of the first mobile node comprises, for each particular node in the list of nodes:

calculating a geographic distance corresponding to the round trip time of the particular node of the list of nodes;

determining one or more candidate geographic locations of the first mobile node, using the geographic distance corresponding to the particular node and geographic location information associated with road portions of the road map dataset; and combining the one or more candidate geographic locations to produce the estimated geographic location of the first mobile node.

5. The method according to claim 4, wherein combining the one or more candidate geographic locations of the first mobile node comprises:

calculating a weighted average of geographic coordinate information for two or more candidate geographic locations, wherein a weight applied to the geographic coordinate information for a particular candidate geographic location is according to one or more measures of wireless signal quality corresponding to a node of the list of nodes used to determine the particular candidate geographic location.

6. The method according to claim 4, wherein combining the one or more candidate geographic locations of the first mobile node comprises:

calculating a statistical measure of the proximity of the one or more candidate geographic locations; and discarding a candidate geographic location of the one or more candidate geographic locations, based on the statistical measure.

7. The method according to claim 1, wherein broadcasting the estimated geographic location of the first mobile node to the plurality of nodes comprises:

periodically transmitting a current estimated geographic location for reception by any node within wireless communication range of the first mobile node.

8. A system for determining a geographic location of a first mobile node within a service area of a wireless network comprising a plurality of nodes including fixed nodes having a constant geographic location and mobile nodes able to move over roads of the service area, the system comprising:

one or more processors configured for communicatively coupling to one or more storage devices for storing geographic location information and messages and to at least one radio frequency interface for wirelessly transmitting messages to and receiving messages from other nodes of the plurality of nodes, the one or more processors operable to, at least:

select up to a certain maximum total number of nodes from the plurality of nodes to produce a list of nodes, wherein the selected nodes are within wireless communication range of the first mobile node;

determine a corresponding round trip time between the first mobile node and each of the nodes of the list of nodes;

calculate an estimated geographic location of the first mobile node using a road map dataset and the round trip times corresponding to the nodes of the list of nodes; and broadcast the estimated geographic location of the first mobile node to the plurality of nodes.

9. The system according to claim 8, wherein the selecting comprises:

determining, by the first mobile node, a number of fixed nodes of the wireless network that are within wireless communication range of the first mobile node;

first adding to the list of nodes up to the certain maximum total number of nodes according to one or more measures of wireless signal quality, those fixed nodes of the wireless network that are within wireless communication range of the first mobile node; and second adding to the list of nodes, after the first adding, up to the certain maximum total number of nodes according to the one or more measures of wireless signal quality, those mobile nodes of the wireless network that are within wireless communication range of the first mobile node, if the number of nodes in the list of nodes after the first adding is less than the certain maximum total number of nodes.

10. The system according to claim 8, wherein determining the corresponding round trip time between the first mobile node and each of the nodes of the list of nodes comprises:

calculating a plurality of round trip time sample values for the first mobile node and a particular node of the list of nodes to produce a corresponding plurality of round trip time values for the particular node using timing of messages transmitted by the first mobile node to the particular node, responses received from the particular node by the first mobile node, and calibration information produced by one or both of the first mobile node and the particular node;

determining a distribution of the round trip time sample values for the particular node; and setting the corresponding round trip time for the particular node to a respective round trip time of a peak in the distribution having a lowest round trip time.

11. The system according to claim 8, wherein calculating the estimated geographic location of the first mobile node comprises, for each particular node in the list of nodes:

calculating a geographic distance corresponding to the round trip time of the particular node of the list of nodes;

determining one or more candidate geographic locations of the first mobile node, using the geographic distance corresponding to the particular node and geographic location information associated with road portions of the road map dataset; and combining the one or more candidate geographic locations to produce the estimated geographic location of the first mobile node.

12. The system according to claim 11, wherein combining the one or more candidate geographic locations of the first mobile node comprises:

calculating a weighted average of geographic coordinate information for two or more candidate geographic locations, wherein a weight applied to the geographic coordinate information for a particular candidate geographic location is according to one or more measures of wireless signal quality corresponding to a node of the list of nodes used to determine the particular candidate geographic location.

13. The system according to claim 11, wherein combining the one or more candidate geographic locations of the first mobile node comprises:

calculating a statistical measure of the proximity of the one or more candidate geographic locations; and discarding a candidate geographic location of the one or more candidate geographic locations, based on the statistical measure.

14. The system according to claim 8, wherein broadcasting the estimated geographic location of the first mobile node to the plurality of nodes comprises:

periodically transmitting a current estimated geographic location for reception by any node within wireless communication range of the first mobile node.

15. A non-transitory computer-readable medium having stored thereon a computer program having a plurality of code sections, each code section comprising a plurality of instructions executable by one or more processors, the executable instructions causing the one or more processors to perform actions of a method for determining a geographic location of a first mobile node within a service area of a wireless network comprising a plurality of nodes including fixed nodes having a constant geographic location and mobile nodes able to move over roads of the service area, wherein each node of the wireless network comprises one or more storage devices for storing geographic location information and messages, and at least one radio frequency interface for wirelessly transmitting messages to and receiving messages from other nodes of the plurality of nodes, the steps of the method comprising:

selecting up to a certain maximum total number of nodes from the plurality of nodes to produce a list of nodes, wherein the selected nodes are within wireless communication range of the first mobile node;

determining a corresponding round trip time between the first mobile node and each of the nodes of the list of nodes;

calculating an estimated geographic location of the first mobile node using a road map dataset and the round trip times corresponding to the nodes of the list of nodes; and broadcasting the estimated geographic location of the first mobile node to the plurality of nodes.

16. The non-transitory computer-readable medium according to claim 15, wherein the selecting comprises:

determining, by the first mobile node, a number of fixed nodes of the wireless network that are within wireless communication range of the first mobile node;

first adding to the list of nodes up to the certain maximum total number of nodes according to one or more measures of wireless signal quality, those fixed nodes of the wireless network that are within wireless communication range of the first mobile node; and second adding to the list of nodes, after the first adding, up to the certain maximum total number of nodes according to the one or more measures of wireless signal quality, those mobile nodes of the wireless network that are within wireless communication range of the first mobile node, if the number of nodes in the list of nodes after the first adding is less than the certain maximum total number of nodes.

17. The non-transitory computer-readable medium according to claim 15, wherein determining the corresponding round trip time between the first mobile node and each of the nodes of the list of nodes comprises:

calculating a plurality of round trip time sample values for the first mobile node and a particular node of the list of nodes to produce a corresponding plurality of round trip time values for the particular node using timing of messages transmitted by the first mobile node to the particular node, responses received from the particular node by the first mobile node, and calibration information produced by one or both of the first mobile node and the particular node;

determining a distribution of the round trip time sample values for the particular node; and setting the corresponding round trip time for the particular node to a respective round trip time of a peak in the distribution having a lowest round trip time.

18. The non-transitory computer-readable medium according to claim 15, wherein calculating the estimated geographic location of the first mobile node comprises, for each particular node in the list of nodes:

calculating a geographic distance corresponding to the round trip time of the particular node of the list of nodes;

determining one or more candidate geographic locations of the first mobile node, using the geographic distance corresponding to the particular node and geographic location information associated with road portions of the road map dataset; and combining the one or more candidate geographic locations to produce the estimated geographic location of the first mobile node.

19. The non-transitory computer-readable medium according to claim 15, wherein combining the one or more candidate geographic locations of the first mobile node comprises:

calculating a weighted average of geographic coordinate information for two or more candidate geographic locations, wherein a weight applied to the geographic coordinate information for a particular candidate geographic location is according to one or more measures of wireless signal quality corresponding to a node of the list of nodes used to determine the particular candidate geographic location.

20. The non-transitory computer-readable medium according to claim 19, wherein combining the one or more candidate geographic locations of the first mobile node comprises:

calculating a statistical measure of the proximity of the one or more candidate geographic locations; and discarding a candidate geographic location of the one or more candidate geographic locations, based on the statistical measure.

21. The non-transitory computer-readable medium according to claim 15, wherein broadcasting the estimated geographic location of the first mobile node to the plurality of nodes comprises:
periodically transmitting a current estimated geographic location for reception by any node within wireless communication range of the first mobile node.

* * * * *